No. 857,178. PATENTED JUNE 18, 1907.
H. H. JACKSON.
CUSPIDOR CLEANER AND LIFTER.
APPLICATION FILED AUG. 13, 1906.
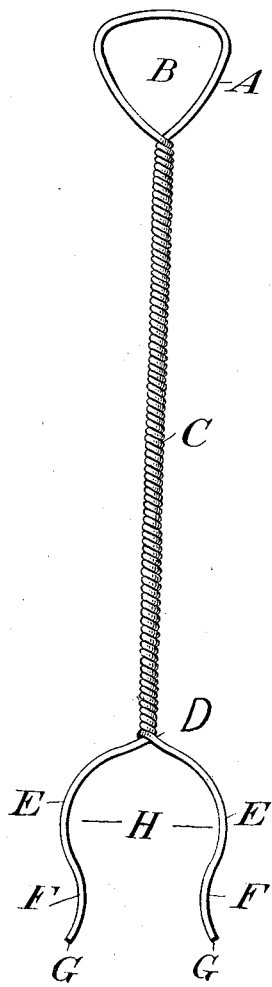
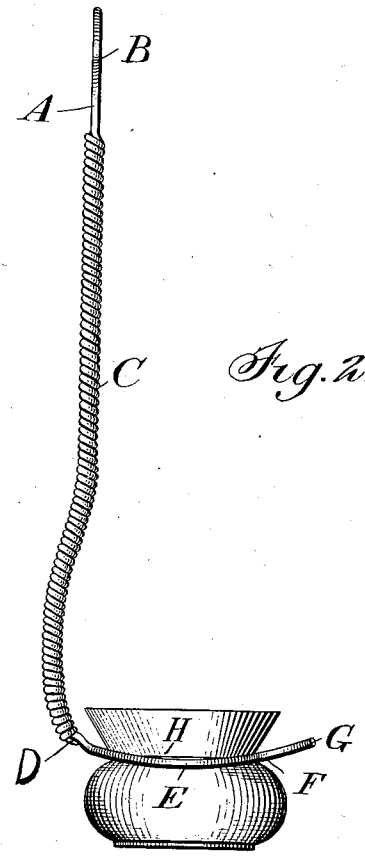
Witnesses:
Inventor:

UNITED STATES PATENT OFFICE.

HERBERT H. JACKSON, OF DETROIT, MICHIGAN.

CUSPIDOR CLEANER AND LIFTER.

No. 857,178.  Specification of Letters Patent.  Patented June 18, 1907.

Application filed August 13, 1906. Serial No. 330,413.

*To all whom it may concern:*

Be it known that I, HERBERT H. JACKSON, a citizen of the United States, and a resident of 293 Milwaukee avenue west, in the city of Detroit, county of Wayne, and State of Michigan, have invented new and useful Improvements in Cuspidor Cleaners and Lifters, of which the following is a true and careful specification.

My invention relates to a device for cleaning and lifting cuspidors and the object thereof is to provide a simple and efficient device to hold a cuspidor while cleaning and lifting the same.

I accomplish the object by the device described herein and as shown in the accompanying drawings, in which,—

Figure I is a side view before the tines are bent upwardly so as to be on a right-angle with the shaft, and Fig. II is an end view showing how shaft and the tines are bent, and shows the manner in which the cuspidor is held by the cleaning and lifting device.

Fig. I in the drawings, A is a piece of wire, which is formed into a loop B, in the center thereof to provide a convenient means for handling the cuspidor cleaner and lifter and for hanging the same upon a hook when not in use. Below the loop B, the two members of the wire are twisted together to form the shaft C, thereby keeping the two members together and forming a rigid portion. Below the shaft C, the two members of the wire are bent gradually outwardly to E, then slightly inwardly to F, and then the ends G spread a little outwardly, thus forming the tines H. As the ends of the tines are spread a little outwardly they thereby act a guide for the tines. The tines H, are bent upwardly so as to project outwardly from the shaft C, at a right angle as shown in Fig. II.

Fig. II is an end view of the cuspidor cleaning and lifting device and shows how the lower portion of shaft C, is curved backwardly to form a convenient space for the rim or bowl of the cuspidor while cleaning or lifting the same. The tines H, are also curved slightly downwardly between the bottom of the shaft C, designated by D, and the ends of the tines designated by G, thus forming a resting place for the cuspidor. Fig. II also shows a cuspidor as held by the cleaning and lifting device while lifting and when cleaning the cuspidor it is put in the tines upside down and dipped in water.

I am aware that devices for holding a cuspidor, which were made of twisted wire and having tines have been patented before, but not a device for cleaning and lifting as herein described.

Having thus fully described my invention what I claim as new and desire to secure by Letters Patent, is—

A cuspidor cleaning and lifting device formed from a single piece of wire bent in the center to form a loop, and having the two members below the loop twisted together to form a shaft, which at its lower portion is curved in the opposite direction to the direction in which the tines project, the two members of the wire below the shaft being bent gradually outwardly, and then slightly inwardly, and then the ends spread a little outwardly, thus forming the tines which are bent upwardly so as to be at a right-angle with the shaft and having the same curved slightly downwardly between the ends of the tines and the shaft, all substantially as shown and described.

In testimony whereof I have set my hand in the presence of two subscribing witnesses this day of August 1906.

HERBERT H. JACKSON.

Witnesses:
 CASS B. RIDDLE,
 MARK M. FESSENDEN.